June 2, 1953 — G. E. WHEELER — 2,640,405
IMPLEMENT HITCH
Filed Nov. 19, 1951 — 2 Sheets-Sheet 1
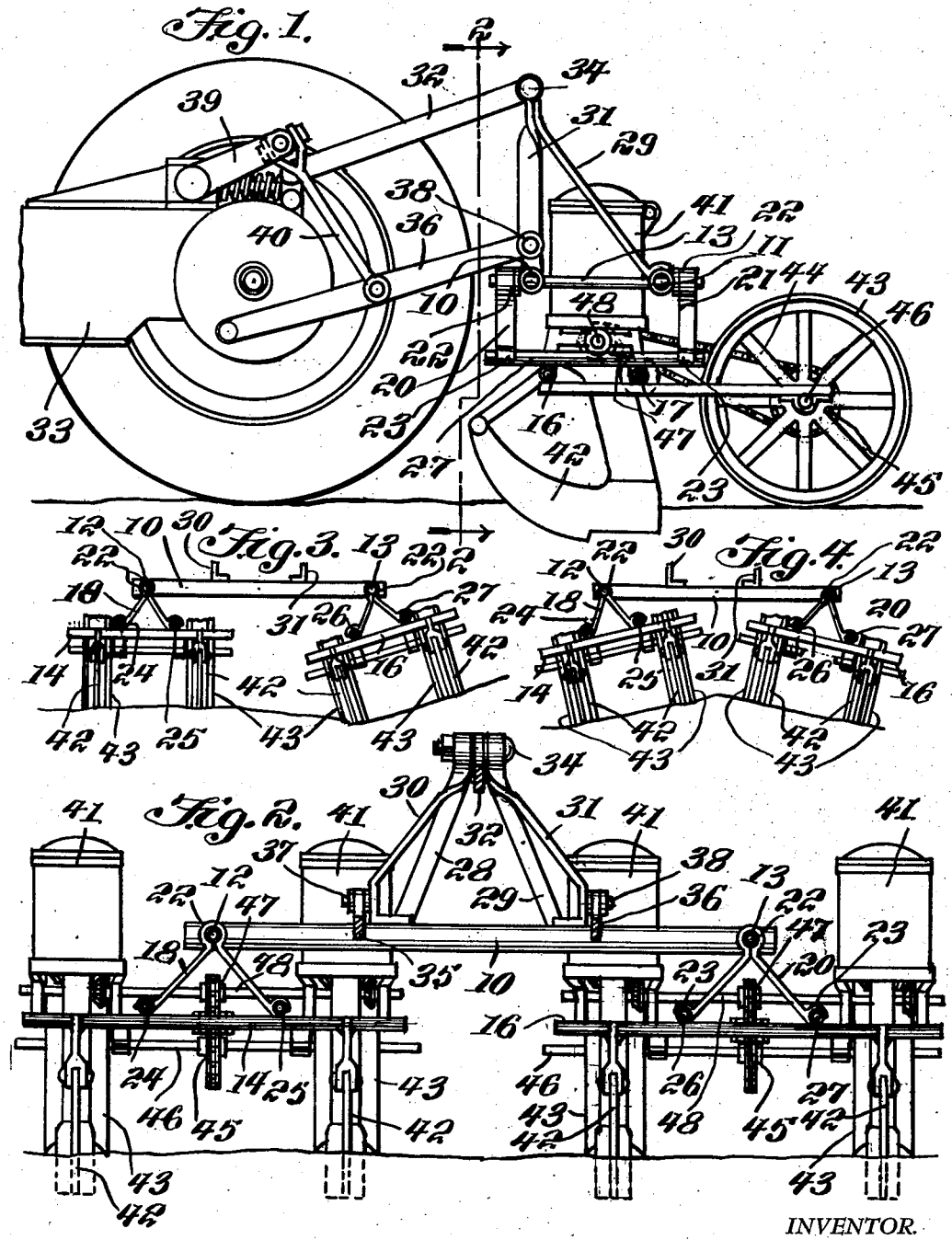
INVENTOR.
Gerald Elza Wheeler,
BY Victor J. Evans & Co.
ATTORNEYS

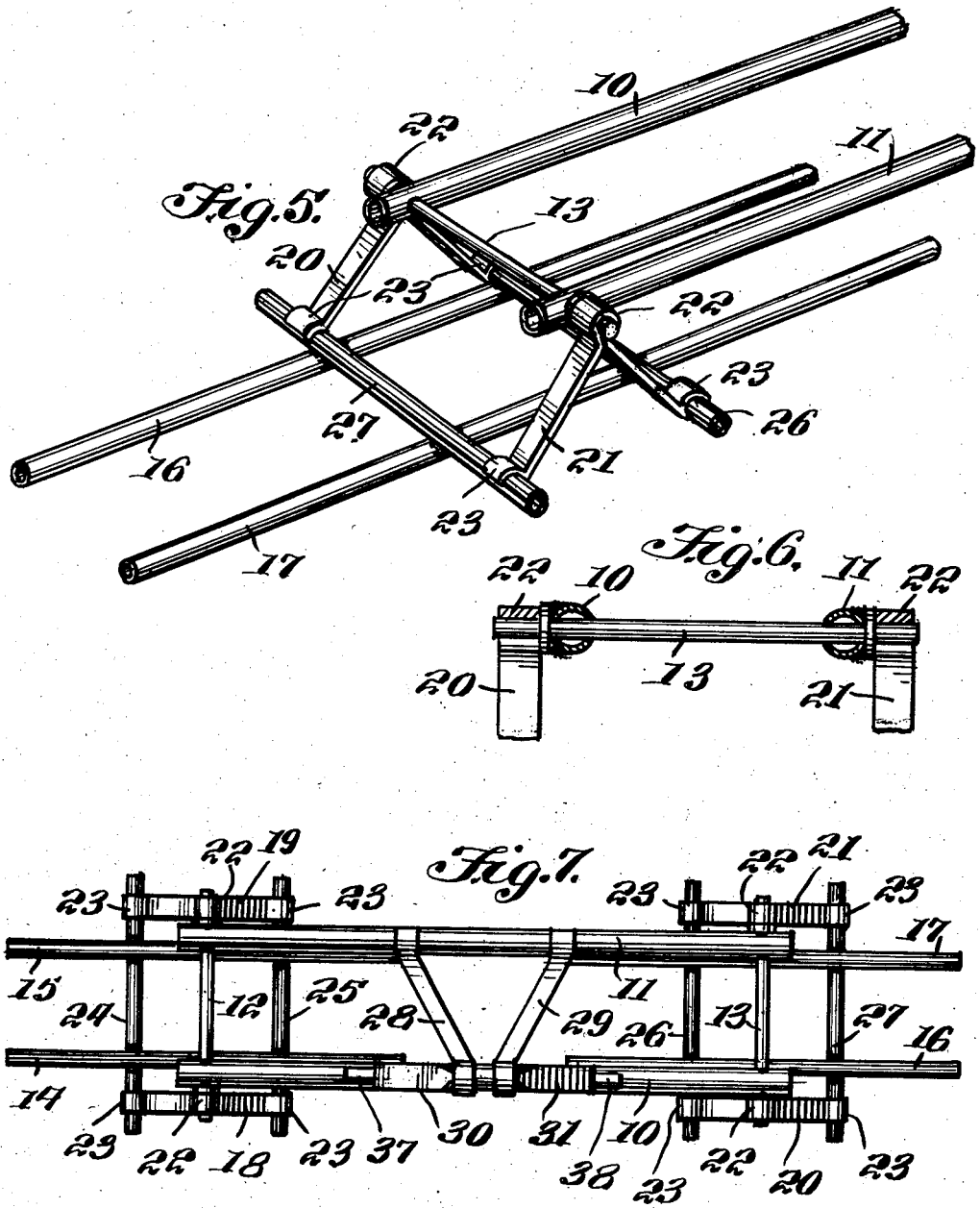

Patented June 2, 1953

2,640,405

UNITED STATES PATENT OFFICE 2,640,405

IMPLEMENT HITCH

Gerald Elza Wheeler, Blytheville, Ark.

Application November 19, 1951, Serial No. 257,037

1 Claim. (Cl. 97—47.61)

This invention relates to a hitch for attaching implements to tractors, and in particular a flexible hitch having a transversely disposed frame attached to the power lift elements of a tractor and having depending frames pivotally mounted on and suspended from the transversely disposed frame whereby implements carried by said depending frames follow the contour of the soil.

The purpose of this invention is to provide a flexible hitch for attaching farm implements to tractors whereby implements such as corn planters, cotton choppers, cultivators and the like may be drawn in pairs wherein each instrument is independently adjustable to the contour of the soil.

Various types of flexible connections have been provided between tractors and farm implements and whereas such devices are successfully used for a single or for two implements it has been found difficult to provide a flexible connection for two or more pairs of implements wherein the elevation of each implement is independently adjustable and wherein the penetration of the implement into the soil or the elevation of the implement above the soil remains constant. With this thought in mind this invention contemplates a substantially horizontally disposed transversely positioned frame suspended by the power lift elements of a tractor with depending cradles pivotally mounted on and carried by the frame and with each of the cradles adapted to carry a pair of implements.

The object of this invention is, therefore, to provide means for forming a flexible hitch whereby with the hitch connected to the power lift elements of a tractor, elements carried by pivotally mounted depending cradles thereon follow the contour of the soil.

Another object of the invention is to provide an improved flexible hitch for attaching a plurality of pairs of implements to a tractor or the like in which different types of implements may be used in combination therewith.

A further object of the invention is to provide an improved flexible hitch for attaching farm implements to tractors which is of a simple and economical construction.

With these and other objects and advantages in view the invention embodies a tractor hitch comprising a pair of substantially horizontally disposed spaced parallel beams with means for attaching the beams to power lift elements of a tractor with spaced longitudinally disposed shafts carried by the beams and with depending cradles, of A-frame construction, carried by the shafts and thereby pivotally mounted on the beams.

Other features and advantages of the invention will appear from the following description taken in connection with the drawings, wherein:

Figure 1 is a side elevational view of the attachment showing corn planter elements suspended from a tractor with the near wheel of the tractor omitted and the rear axle housing shown in section.

Figure 2 is a front elevational view illustrating the attachment with corn planter elements carried thereby with the elements for attaching the device to the power lift of a tractor shown in section and with the section taken on line 2—2 of Figure 1.

Figure 3 is a detail illustrating the attachment detached from a tractor illustrating the rocking movement of implements carried by parts of the attachment.

Figure 4 is a view similar to that shown in Figure 3 showing pairs of elements of the attachments on opposite sides of a ridge.

Figure 5 is a detail illustrating the construction of a cradle at one end of the attachment showing a pair of parallel instrument supporting rods pivotally mounted in the ends of a pair of parallel beams.

Figure 6 is a detail showing a longitudinal section through the shaft at one end of the attachment and showing the shaft extended through the beams and showing arms of a cradle carried by ends of the shaft.

Figure 7 is a plan view showing the attachment assembled.

Referring now to the drawings wherein like reference characters denote corresponding parts the flexible hitch or implement attachment of this invention includes a pair of parallel beams 10 and 11 with shafts 12 and 13 extended through the ends and with parallel implement supporting rods, 14 and 15 at one end and 16 and 17 at the opposite end suspended from the ends of the shafts, with V-shaped brackets 18 and 19 on the ends of the shaft 12 for supporting the bars 14 and 15, and 20 and 21 on the ends of the shaft 13 for supporting the rods 16 and 17.

The supporting brackets provide substantially A-frame construction with flat bars, from which the brackets are formed, shaped to form hubs 22 through which the brackets are pivotally mounted on the ends of the shafts and with flanges 23 at the lower ends of the arms thereof extended over bars 24 and 25 of the brackets carried by the shaft 12 and 26 and 27 of the brackets carried by the shaft 13.

The lower ends of the arms of the brackets are secured to the bars, preferably by welding and the bars are secured to the rods which support the implements also by welding.

With the parts formed in this manner a flexible hitch is provided wherein implements carried by the ends of the rods 14 and 15 at one side and 16 and 17 at the other will follow the contour of the soil, as illustrated in Figures 3 and 4 with each implement raised and lowered independently by ground engaging elements.

In the design shown the flexible hitch is provided with upwardly extended struts 28 and 29, mounted on the beam 11 and braces 30 and 31 mounted on the beam 10. The upper ends of the struts and braces are connected to an upper power lift arm 32 of a tractor as indicated by the numeral 33 with a bolt 34. The lower power lift arms 35 and 36 of the tractor are connected to the lower ends of the braces 30 and 31 with bolts 37 and 38, respectively. The arms 35 and 36 are connected to the power lift lever 39 of the tractor with a rod 40, as shown in Figure 1.

Also, in the design shown the flexible hitch of this invention is illustrated with corn planter elements including hoppers 41, swords 42 and ground engaging and covering rollers 43 mounted on the ends of the rods 14 and 15 at one end and 16 and 17 at the opposite end. The feed mechanism of the hopper of each unit is actuated with a belt 44 trained over a pulley 45 on the shaft 46 of the wheel 43 and also over a pulley 47 on a shaft 48 of the feed mechanism.

These elements are secured to the rods 14 and 15 at one end and 16 and 17 at the other by suitable means, and as the implements are drawn over the ground the penetration of the swords 42 in the ground is controlled by the wheels 43.

It will also be understood that the ground engaging elements may be in the form of shoes, such as the ground engaging shoes of a corn planter, wherein plates with arcuate upwardly curved forward ends extend downwardly from the parallel rods, to engage the surface of the soil for providing leveling means to maintain elements constant distances above or below the soil. The ground engaging elements may also be of other types or designs.

It will also be understood that the flexible hitch of this invention may be used for other types of farm implements such as cotton choppers, cultivators and the like.

It will be understood that modifications may be made in the design and arrangement of the parts without departing from the spirit of the invention.

What is claimed is:

In a flexible hitch for attaching implements to tractors, the combination which comprises a pair of transversely disposed parallel beams, struts positioned midway of the length of the beams extended upwardly from one of said beams, braces supporting the upper ends of the struts from the other of said beams, said struts and braces providing means for attaching the hitch to a tractor or the like, shafts carried by the beams and spaced from the ends thereof, said shafts being positioned transversely of the beams, inverted V-shaped brackets having hubs positioned with the hubs pivotally mounted on the ends of the shafts carried by the beams and having outwardly diverging arms extended downwardly from the hubs, spaced parallel bars also positioned transversely of the beams, parallel to the shafts, fixedly attached to and connecting the lower ends of the arms of the brackets and spaced parallel implement carrying rods parallel to the beams, positioned below and carried by said bars and positioned with ends thereof extended from both sides of the brackets.

GERALD ELZA WHEELER.

References Cited in the file of this patent

UNITED STATES PATENTS

| Number | Name | Date |
|---|---|---|
| 1,079,566 | Lancaster | Nov. 25, 1913 |
| 2,333,586 | Rude | Nov. 2, 1943 |
| 2,336,152 | Rude | Dec. 7, 1943 |

FOREIGN PATENTS

| Number | Country | Date |
|---|---|---|
| 554,033 | Great Britain | June 16, 1943 |